United States Patent
Hodgman et al.

(10) Patent No.: US 10,594,655 B2
(45) Date of Patent: *Mar. 17, 2020

(54) CLASSIFYING LOCATOR GENERATION KITS

(71) Applicant: Rapid7, Inc., Boston, MA (US)

(72) Inventors: Roy Hodgman, Cambridge, MA (US); Aditya Kuppa, Belfast (IE); Suchin Gururangan, Somerville, MA (US); Andrew Reece, Los Altos, CA (US)

(73) Assignee: Rapid7, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/242,030

(22) Filed: Jan. 8, 2019

(65) Prior Publication Data
US 2019/0141012 A1 May 9, 2019

Related U.S. Application Data

(63) Continuation of application No. 15/200,530, filed on Jul. 1, 2016, now Pat. No. 10,205,704.

(51) Int. Cl.
*H04L 29/06* (2006.01)

(52) U.S. Cl.
CPC ...... *H04L 63/0236* (2013.01); *H04L 63/1425* (2013.01); *H04L 63/1466* (2013.01)

(58) Field of Classification Search
CPC .... G06F 17/30887; G06N 3/08; G06N 20/00; H04L 63/0236; H04L 63/1425; H04L 63/1466
See application file for complete search history.

(56) References Cited

U.S. PATENT DOCUMENTS

| 9,825,976 | B1 | 11/2017 | Gomez | |
|---|---|---|---|---|
| 2013/0312092 | A1* | 11/2013 | Parker | H04L 63/1408 726/22 |
| 2014/0298460 | A1 | 10/2014 | Xue | |

OTHER PUBLICATIONS

Eshete et. al. (EKHunter: A counter-Offensive Toolkit for Exploit Kit Infiltration, retrieved Jul. 20, 2019 from http://csl.sri.com/users/porras/EKHunter.pdf) (Year: 2015).*
Stock, Kizzle: A Signature Complier for Exploit Kits, available at https://www.microsoft.com/en-us/research/wp-content/uploads/2017/01/dsn16.pdf (2015).
Eshete, Birhanu. WebWinnow:Leveraging Exploit Kit Workflows to Detect Malicious URLS, (2014), available at https://dl.acm.org/citation.cfm?id=2557575.
Arseni, Stefano. HYPER-SIFT: Multi-Family Analysis and Detection of Exploit Kits. (2013). Available at https://indigo.uic.edu/handle/10027/20847.
Zhang, Wen. Malicious web page detection based on on-linelearning algorithm, (2011), available at https://www.researchgate.net/publication/221544821_Malicious_web_page_detection_based_on_on-line_learning_algorithm.

* cited by examiner

*Primary Examiner* — Brian F Shaw
(74) *Attorney, Agent, or Firm* — Danielson Legal LLC

(57) ABSTRACT

Methods and systems for classifying malicious locators. A processor is trained on a set of known malicious locators using a non-supervised learning procedure. Once trained, the processor may classify new locators as being generated by a particular generation kit.

20 Claims, 3 Drawing Sheets

CLASSIFYING LOCATOR GENERATION KITS

The present application claims the benefit of pending U.S. utility patent application Ser. No. 15/200,530, filed on Jul. 1, 2016, and issued as U.S. patent Ser. No. 10/205,704, on Feb. 12, 2019, the entire disclosure of which is incorporated by reference as if set forth in its entirety herein.

TECHNICAL FIELD

This invention generally relates to methods and systems for classifying malicious locators, and in particular to methods and systems for classifying malicious locators by their originating software.

BACKGROUND

Due to their prevalence in today's society and popularity for connecting financial resources and data sources, the internet and other connected networks have become a hub for criminal activity. Criminal enterprises and/or threat actors often attempt to install malware or other types of harmful software on systems by directing unsuspecting users to malicious network resources (e.g., malicious web addresses) through hyperlinks or other locators, for example.

Oftentimes online malware or phishing attack campaigns have a large number of these locators to implement the same or a similar attack payload. This ensures the viability of a threat vector, even when a locator or a subset of locators are identified and blacklisted by security personnel.

These types of attack campaigns are facilitated by kits that automatically generate locators (e.g., URLs and URIs) that may appear benign, but at the same time may direct intended target(s) to malicious resources. In an effort to make locators appear authentic and non-malicious, these kits may generate locators with technically-appropriate filenames (e.g., sys.php, xml.htm, etc.) and/or with names that appear to be legitimate directories found on a web server (e.g., xxx.com/admin/logfiles/sys.php).

Existing techniques for classifying malicious locators may enable users to build pattern-matching rules to identify classes and families of malware. However, these techniques are necessarily retrospective in scope, and are not well-suited to addressing new threats that have not been studied and classified.

A need exists, therefore, for methods and systems that overcome these deficiencies.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect, embodiments relate to a method for classifying malicious locators accessible through a network. The method includes accessing, through an interface to a computer-readable medium, a plurality of locators, wherein each locator comprises the location of a malicious network-accessible resource; extracting at least one feature from each of the plurality of locators; labeling each of the plurality of locators as being generated by a specific source based on the extracted features; providing the extracted features and the source label for each of the plurality of locators to a classification module to train the classification module; and applying the classification module to a second locator to determine a source of the second locator.

In one embodiment, the at least one locator is a uniform resource locator (URL).

In one embodiment, labeling each of the plurality of locators as being generated by a specific source includes labeling each of the plurality of locators as being generated by a specific URL-generation kit.

In one embodiment, the method further includes assigning a membership probability to each of the plurality of locators, the membership probability representing a probability a locator was generated by a specific source. In one embodiment, the label assigned to each of the plurality of locators is based on a highest membership probability for each of the plurality of locators.

In one embodiment, the at least one feature includes one or more of locator string length, character frequency distribution, domain levels, number of directories, number of words, number of words from a predetermined list of words, number of vowels, and number of consonants in the locator.

In one embodiment, the method further includes producing weights from the classification module related to each of the at least one feature to assist in determining a source for the second locator.

In one embodiment, the method further includes issuing a message indicating the source of the second locator.

In one embodiment, the method further includes classifying the second locator as malicious or non-malicious.

In another aspect, embodiments relate to a system for classifying malicious locators accessible through a network. The system includes an interface to a computer-readable medium configured to access a plurality of locators, each of the plurality of locators comprising the location of a malicious network-accessible resource; a network interface; and a processor in communication with the medium interface and the network interface, the processor configured to extract at least one feature from each of the plurality of locators; label each of the plurality of locators as being generated by a specific source based on the extracted features; and provide the extracted features and the source label for each of the plurality of locators to a classification module to train the classification module so the classification module can determine a source of a second locator.

In one embodiment, the locator is a uniform resource locator (URL).

In one embodiment, the processor is configured to label each of the plurality of locators as being generated by a specific URL-generation kit.

In one embodiment, the processor is configured to assign a membership probability to each of the plurality of locators, the membership probability representing a probability a locator was generated by a specific source. In one embodiment, the label assigned to each of the plurality of locators is based on a highest membership probability for each of the plurality of locators.

In one embodiment, the at least one feature includes one or more of locator string length, character frequency distribution, domain levels, number of directories, number of words, number of words from a predetermined list of words, number of vowels, and number of consonants in the locator.

In one embodiment, the processor is configured to produce weights related to each of the at least one feature to assist in determining a source for the second locator.

In one embodiment, the processor is configured to issue a message indicating the source of the second locator.

In one embodiment, the processor is configured to classify the second locator as malicious or non-malicious.

In one embodiment, the processor is configured to assign weights to the second locator to determine a family the second locator belongs to and further configured to determine a locator generation kit that generated the second locator based on the family.

In yet another aspect, embodiments relate to a computer readable medium containing computer-executable instructions for performing a method for classifying malicious locators accessible through a network. The medium includes computer-executable instructions for accessing, through an interface to a computer-readable medium, a plurality of locators, wherein each locator comprises the location of a malicious network-accessible resource; computer-executable instructions for extracting at least one feature from each of the plurality of locators; computer-executable instructions for labeling each of the plurality of locators as being generated by a specific source based on the extracted features; computer-executable instructions for providing the extracted features and the source label for each of the plurality of locators to a classification module to train the classification module; and computer-executable instructions for applying the classification module to a second locator to determine a source of the second locator.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
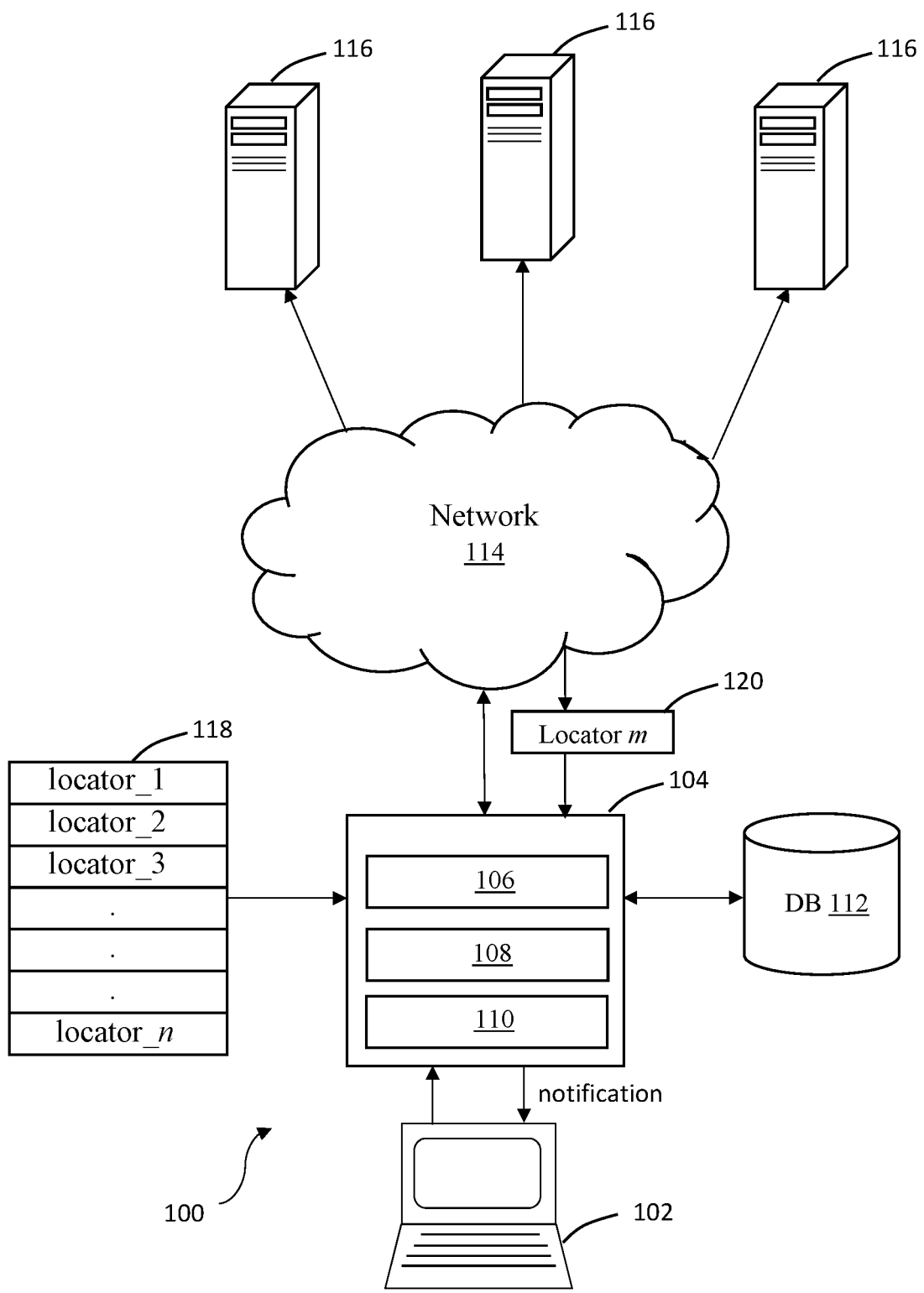
FIG. 1 illustrates a system for classifying malicious locators in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In the context of the present application, the term "locator" may refer to a location of a network-accessible resource on a network. This locator may be defined as a uniform resource identifier (URI) or a uniform resource locator (URL), for example.

Methods and systems of various embodiments of the invention may use a training set of malicious locators (e.g., a set of URLs or URIs) to train a machine learning model. Based on particular features associated with each locator, components of the present invention may determine the software generation kit that generated the locator(s). This information may then be used to classify new locators according to their originating software.

Features of the present invention may be suited to a variety of applications. For example, the systems and methods of the various embodiments of the invention may track the rise and fall in popularity of different locator-generation kits. Longitudinal tracking of these trends may provide valuable intelligence for mapping and predicting, for example, URL-based threat landscapes.

As another example, the inventive systems and methods may be incorporated into computing security software. For example, if certain classes of malware are known to employ specific URL-generators, then features of the invention may enhance risk assessment accuracy and threat vector prioritization.

FIG. 1 presents a system 100 for classifying malicious locators in accordance with one embodiment. The system 100 may include an interface 102 to a computer-readable medium; a processor 104 with a cluster module 106, a training module 108, and a classification module 110; a database 112; and a communication network 114 to enable communication with one or more servers 116.

The interface 102 may be implemented as a laptop, desktop, tablet, smartphone, or any other similar device that may be used by an operator to interact with the system.

The processor 104 may be any device capable of executing the cluster module 106, the training module 108, and the classification module 110 to accomplish the various features of the invention. The processor 104 may be a microprocessor, a field programmable gate array (FPGA), an application-specific integrated circuit (ASIC), or other similar device. In some embodiments, such as those relying on one or more ASICs, the functionality described as being provided in part via software may instead be configured into the design of the ASICs and, as such, the associated software may be omitted. The processor 104 may be configured as part of the interface 102 (e.g., a laptop) or may be remotely located. That is, the execution of the various modules 106, 108, and 110 may be done on a server at a remote location, and the output of the processor 104 can be used to determine what is presented via the interface 102, which is distinct from the server.

The cluster module 106 may be configured to execute an unsupervised clustering procedure to identify latent class relationships among a training set of locators 118. In other words, the cluster module 106 may find "families" of locators with similar characteristics. These families may be assumed to have been generated by different kits.

The training set of locators 118, which may include a kit-family assignation for each locator, may then be communicated to the training module 108. The training module 108 may be configured to execute a supervised learning procedure using statistical features of the locators (and the kit-family assignations as training labels, if applicable). The resulting model may calculate weights for each feature of the training locators to assist in future classifications.

Data regarding the statistical features, the corresponding kit-family assignations, and the calculated weights may then be communicated to the classification module 110. The classification module 110 may use the training data regarding kit-family memberships for new locators 120.

The database 112 may store information related to previous classifications of particular locators, as well as other information relating to processor execution and data training sets. The processor 104 may query the database 112 when appropriate to retrieve information related to a particular feature and/or locator, for example.

The network 114 may link various devices with various types of network accessible resources that may be accessed using locators such as URIs or URLs. The network 114 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network 114 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GS) link, a cellular digital packet data (CDPD) link, a Research in Motion, Limited (RIM) duplex paging type device, a Bluetooth radio link, or an IEEE 802.11-based link.

Figure 2:
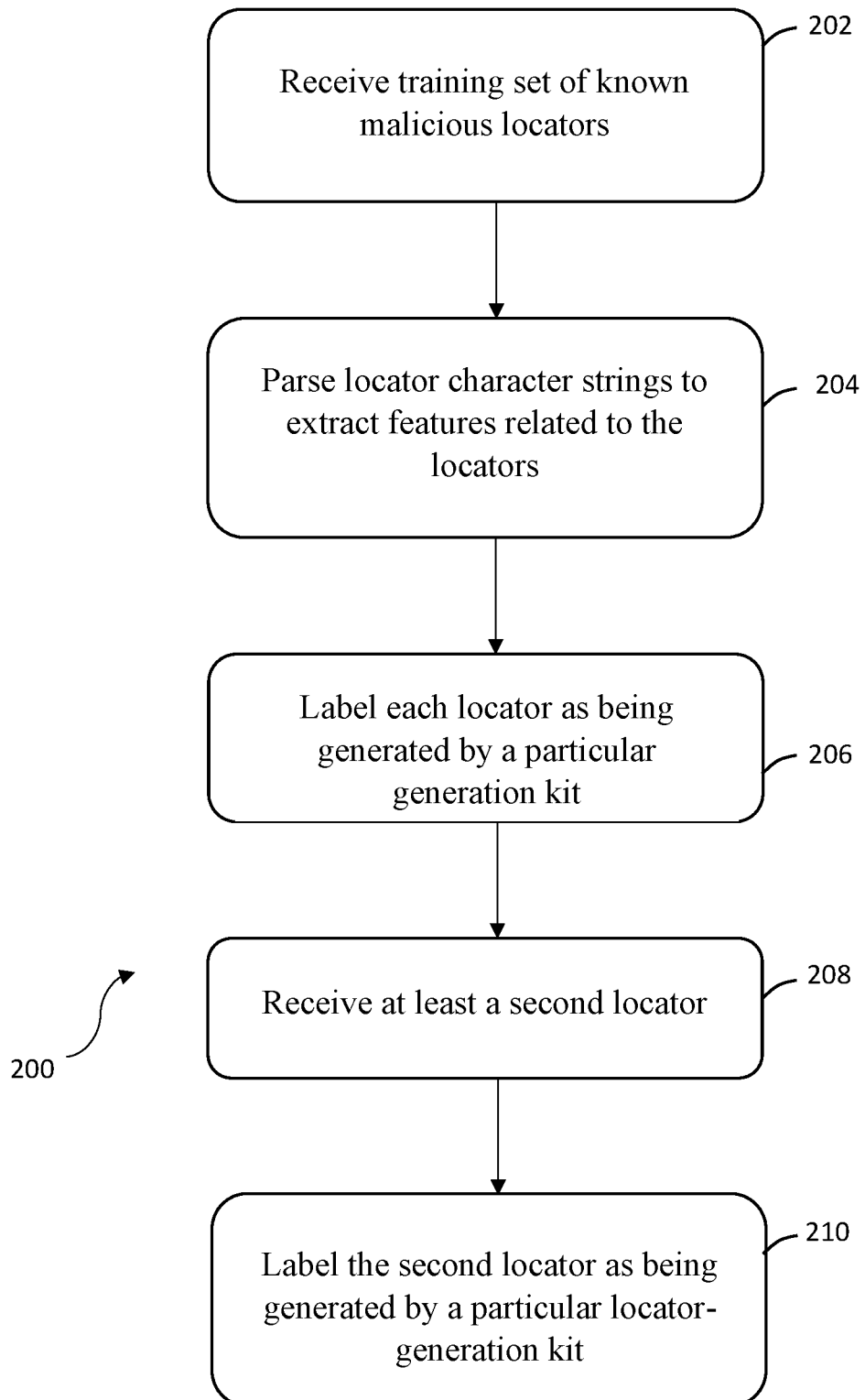
FIG. 2 depicts a flowchart of a method for classifying malicious locators in accordance with one embodiment.

FIG. 2 depicts a flowchart of a method 200 for classifying malicious locators in accordance with one embodiment. As shown, the method 200 includes the steps of receiving a training set (or multiple training sets) of known malicious locators 202 (which may be similar to the training set 118 of FIG. 1), parsing the locator character strings to extract features related to the locators 204, and labeling each locator as being generated by a particular generation kit 206.

Steps 204 and 206 may be performed by implementing any one of a variety of machine learning procedures. The execution of various components of the processor 104, namely, the cluster module 106 and training module 108, may first involve developing a decision boundary between sets of locators belonging to various kit-generation families. For each locator sample, categorical variables may be encoded into vectors by converting them to "dummy values" to indicate the presences of a categorical feature in a sample (e.g., by one-hot encoding). The training process may also include a dimensionality reduction step, in which the feature set dimensionality is reduced (e.g., by principal component analysis) to a set of features that spans the most variance of the data.

These features may be organized into a binary tree, and the features selected may be computed based on gini entropy. Gini entropy measures how accurate a given decision boundary would be if the labeled samples were divided into separate groups according to a feature threshold. It follows that an optimal feature threshold is one that has minimum gini entropy.

The training process may further include a testing phase. This phase may test (e.g., on held-out data) the developed model using a cross-validation step based on k iterations to determine which model has the highest accuracy. For example, features of the present invention may use a random forest classification technique. This extends the decision tree classifier by applying multiple decision tree classifiers on random subsets of the training data, and then averaging each of their classifications. It is also contemplated that other machine learning procedures, in addition to random forest techniques, may be used to accomplish the various features of the invention.

Once trained, the method 200 may proceed to step 208 which involves receiving at least a second locator, and then to step 210 which involves labeling the second locator as being generated by a particular generation kit. The classification module 110 may output a designation for each locator regarding the locator's generation software (kit), as well as information regarding why the locator was assigned a particular designation. A designation of "unknown" or "inconclusive" may be assigned as well to indicate that security personnel should research further. The designation can then be forwarded to another system for integration with another classification schema or to an end-user in the form of an alert notification for particular locators.

Figure 3:
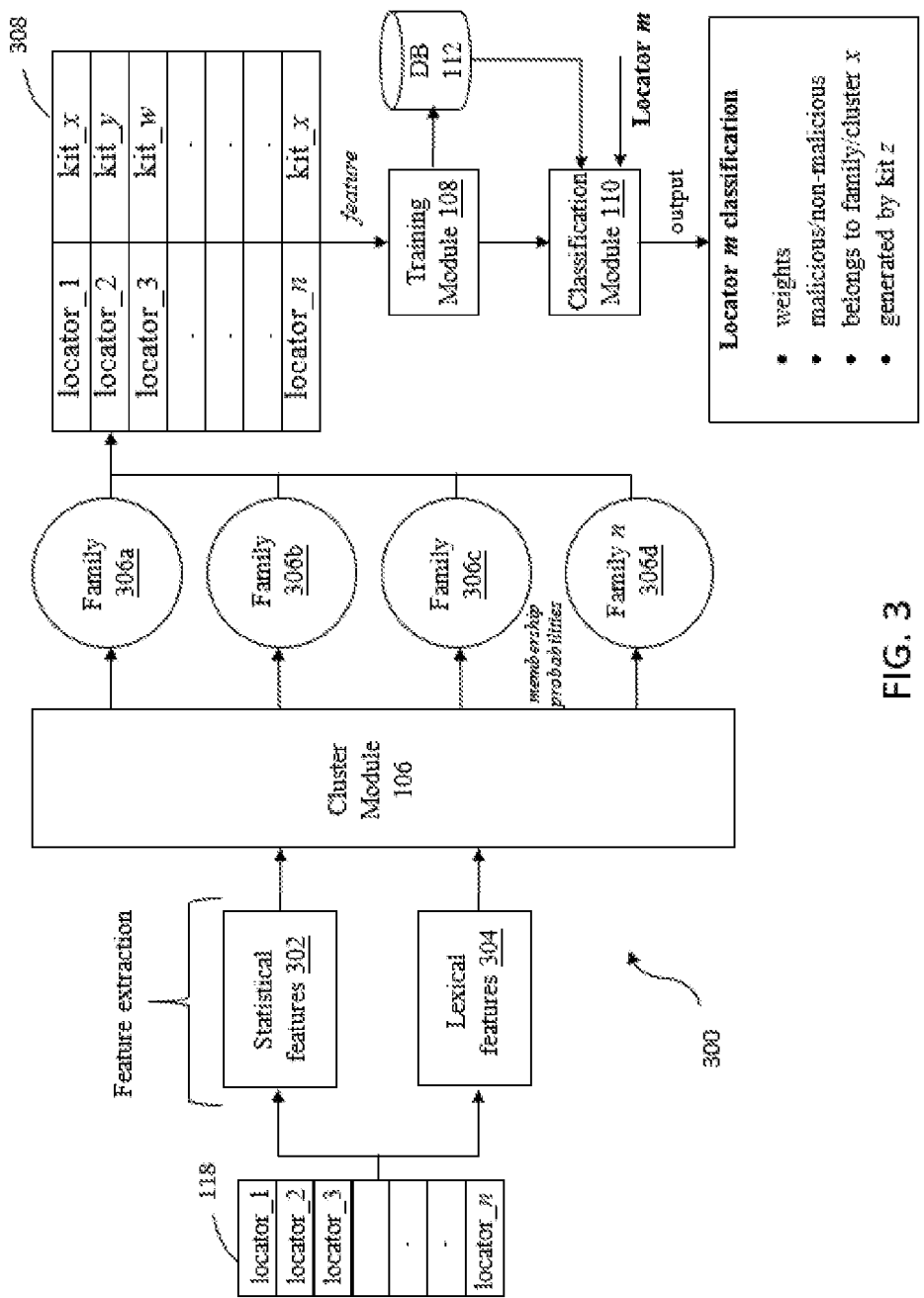
FIG. 3 depicts an exemplary application of the method of FIG. 2 in accordance with one embodiment.

FIG. 3 illustrates an exemplary application 300 of the method 200 of FIG. 2 in detail. First, the set of locators 118 that have been pre-identified as malicious (e.g., they may contain malware payloads or lead to phishing sites) may be provided to a processor such as the processor 104 of FIG. 1. The locator character strings may then be parsed in step 204 to extract features relating to each of the locators.

These features may include statistical features 302 and/or lexical features 304. Statistical features 302 may be related to descriptive features of the locator, such as character frequency distribution, string length, the number of domain levels, the number of the directories in the locator (e.g., URL) path, or the like. Lexical features 304 may include the number of detectable words, number of words from a predetermined list of words (e.g., a list containing several words commonly associated with malicious locators), the vowel/consonant ratio, the number of special characters (e.g., #, $, !, ?, @ etc.), the placement of vowels/consonants, parts of speech, or the like.

The features 302 and 304 may then be fed into the cluster module 106. The cluster module 106 may implement an unsupervised clustering procedure (such as the machine learning technique described above) to identify latent class relationships among the various locators based on their extracted features. That is, the cluster module 106 may find "families" 306 of locators with similar characteristics.

The cluster module 106 may then, for each locator, assign membership probabilities that represent the probability a particular locator belongs to a certain family 306a-d. It may be assumed that each family represents a different generation kit. That is, a locator that belongs to family 306a is assumed to have been generated by a different kit than a locator that belongs to family 306b. A locator may be labeled as belonging to the family for which it has the highest membership probability score.

The output of the cluster module 106 may be a list 308 of malicious locators that are each labeled as having been generated be a specific kit. This list 308 may be provided to the training module 108 which may implement a supervised learning procedure using the kit-family assignments as training labels. More specifically, the training module 108 may produce weights for each feature that can be used to at least assist in classifying new locators.

This information may be communicated to and stored in the database 112 for future classifications, and may also be communicated directly to the classification module 110. Data related to the weights, features, and kit designations may also be communicated to the database 112 and/or the classification module 110 to be used in future classifications for new locators.

Step 208 involves receiving at least a second locator and is shown in FIG. 3 as locator m being provided to the classification module 110. As shown, the classification module 110 may be in communication with the training module 108 as well as the database 112. Based on the information gathered in steps 202, 204, and 206, the classification module 110 may not only classify the locator m (e.g., whether locator m is malicious/non-malicious) but also determine the specific kit that generated locator m.

The classification module 110 may implement any suitable supervised learning procedure to classify the locator m. For example, the classification module 110 may extract features related to locator m (such as the statistical features and/or the lexical features discussed previously), and compare them to the features of locators from the training set 118 and the subsequent classifications of those locators. Based on these comparisons, the classification module 110 may assign membership probabilities to locator m that represent the locator m's probability of belonging to a particular family. The classification module 110 may then assume locator m was generated by the generation kit associated with the family with which the locator m has the highest membership probability.

The output of the classification module 110 with regard to the locator m's classification may be presented via interface 102 in the form of a notification or an alert. This notification or alert may be a video based notification, an audio-based notification, a haptic-based notification, or some combination thereof. The notification may inform a user regarding the classification, and additional actions may be taken such as adding the locator to a list of malicious locators and/or adding the locator to a list of locators generated by the particular kit.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for classifying malicious locators accessible through a network, the method comprising:
   receiving, through an interface to a non-transitory computer-readable medium, at least a first locator that comprises the location of a first malicious network-accessible resource;
   extracting at least one feature associated with the first locator;
   encoding at least the first locator into a vector that indicates a presence of the at least one extracted feature:
   comparing the vector indicating the presence of the at least one extracted feature to a decision boundary between sets of locators belonging to various kit families, wherein accuracy of the decision boundary is optimized by selecting features with minimum gini entropy;
   assigning a membership probability to the first locator based on the comparison of the vector to the decision boundary, wherein the membership probability represents a probability that the first locator belongs to a particular family of kits;
   labeling the first locator as being generated by a first kit that is associated with a first family based on the membership probability assigned to the first locator;
   outputting the label of the first locator to a user; and
   outputting data regarding why the first locator was labeled as being generated by the first kit to the user.

2. The method of claim 1, wherein the first locator is a uniform resource locator (URL).

3. The method of claim 1, wherein labeling the first locator as being generated by the first kit includes labeling the first locator as being generated by a specific URL-generation kit.

4. The method of claim 1, further comprising:
   accessing a plurality of training locators that each comprise the location of a malicious network-accessible resource;
   extracting at least one feature associated with each of the plurality of training locators;
   labeling each of the plurality of training locators as being generated by a specific kit that is associated with a specific family based on the extracted features;
   providing the extracted features and the source label for each of the plurality of locators to a classification module to train the classification module by generating the decision boundary between sets of locators belonging to various kit families.

5. The method of claim 4, wherein the label assigned to each of the plurality of training locators is based on a highest membership probability for each of the plurality of training locators.

6. The method of claim 1, wherein the at least one feature includes one or more of locator string length, character frequency distribution, domain levels, number of directories, number of words, number of words from a predetermined list of words, number of vowels, and number of consonants in at least one of the first locator and the second locator.

7. The method of claim 1, further comprising producing weights for the at least one feature to assist in determining the kit that generated the first locator.

8. The method of claim 1, further comprising:
   accessing, through the interface, a second locator that comprises the location of a second malicious network-accessible resource;
   extracting at least one feature associated with the second locator;
   encoding at least the second locator into a second vector that indicates a presence of the at least one extracted feature;
   comparing the second vector indicating the presence of the at least one extracted feature to the decision boundary;
   assigning a membership probability to the second locator based on the comparison of the second vector to the decision boundary, wherein the membership probability represents a probability the second locator belongs to a particular family of kits; and
   labeling the second locator as being generated by a second kit that is different than the first kit, wherein the second kit is associated with the first family.

9. The method of claim 1, further comprising classifying the first locator as malicious or non-malicious.

10. A system for classifying malicious locators accessible through a network, the system comprising:

an interface to a non-transitory computer-readable medium configured to access at least a first locator that comprises the location of a first malicious network-accessible resource;
a network interface; and
a processor in communication with the medium interface and the network interface, the processor configured to:
  extract at least one feature associated with the first locator;
  encode at least the first locator into a vector that indicates a presence of the at least one extracted feature;
  compare the vector indicating the presence of the at least one extracted feature to a decision boundary between sets of locators belonging to various kit families, wherein accuracy of the decision boundary is optimized by selecting features with minimum gini entropy;
  assign a membership probability to the first locator based on the comparison of the vector to the decision boundary, wherein the membership probability represents a probability that first locator belongs to a particular family of kits;
  label the first locator as being generated by a first kit that is associated with a first family based on the membership probability assigned to the first locator;
  output the label of the first locator to a user; and
  output data regarding why the first locator was labeled as being generated by the first kit to the user.

11. The system of claim 10, wherein the first locator is a uniform resource locator (URL).

12. The system of claim 10, wherein the processor is configured to label the first locator as being generated by a specific URL-generation kit.

13. The system of claim 10, wherein the processor is configured to:
  access a plurality of training locators that each comprise the location of a malicious network-accessible resource;
  extract at least one feature associated with each of the plurality of training locators;
  label each of the plurality of training locators as being generated by a specific kit that is associated with a specific family based on the extracted features;
  provide the extracted features and the source label for each of the plurality of locators to a classification module to train the classification module by generating the decision boundary between sets of locators belonging to various kit families.

14. The system of claim 13, wherein the label assigned to each of the plurality of training locators is based on a highest membership probability for each of the plurality of locators.

15. The system of claim 10, wherein the at least one feature includes one or more of locator string length, character frequency distribution, domain levels, number of directories, number of words, number of words from a predetermined list of words, number of vowels, and number of consonants in at least one of the first locator and the second locator.

16. The system of claim 10, wherein the processor is configured to produce weights for each of the at least one feature to assist in determining the kit that generated the first locator.

17. The system of claim 10, wherein the processor is further configured to:
  access through the interface a second locator that comprises the location of a second malicious network-accessible resource;
  extract at least one feature associated with the second locator;
  encode at least the second locator into a second vector that indicates a presence of the at least one extracted feature;
  compare the second vector indicating the presence of the at least one extracted feature to the decision boundary
  assign a membership probability to the second locator based on the comparison of the second vector to the decision boundary, wherein the membership probability represents a probability the second locator belongs to a particular family of kits; and
  label the second locator as being generated by a second kit that is different than the first kit, wherein the second kit is associated with the first family.

18. The system of claim 10, wherein the processor is configured to classify the first locator as malicious or non-malicious.

19. The system of claim 13, wherein the processor is configured to assign weights to the at least one feature associated with each of the plurality of training locators.

20. A non-transitory computer readable medium containing computer-executable instructions for performing a method for classifying malicious locators accessible through a network, the medium comprising:
  computer-executable instructions for receiving, through an interface to a non-transitory computer-readable medium, at least a first locator that comprises the location of a first malicious network-accessible resource;
  computer-executable instructions for extracting at least one feature associated with each of the first locator and the second locator;
  computer-executable instructions for encoding at least the first locator into a vector that indicates a presence of the at least one extracted feature;
  computer-executable instructions for comparing the vector indicating the presence of the at least one extracted feature to a decision boundary between sets of locators belonging to various kit families, wherein accuracy of the decision boundary is optimized by selecting features with minimum gini entropy;
  computer-executable instructions for assigning a membership probability to the first locator based on the comparison of the vector to the decision boundary, wherein the membership probability represents a probability that the first locator belongs to a particular family of kits;
  computer-executable instructions for labeling the first locator as being generated by a first kit that is associated with a first family based on the membership probability assigned to the first locator;
  computer-executable instructions for outputting the label of the first locator to a user; and
  computer-executable instructions for outputting data regarding why the first locator was labeled as being generated by the first kit to the user.

* * * * *